June 26, 1945.    H. EGLESTON    2,379,287
BACK-OFF APPARATUS
Filed April 6, 1943    5 Sheets-Sheet 1
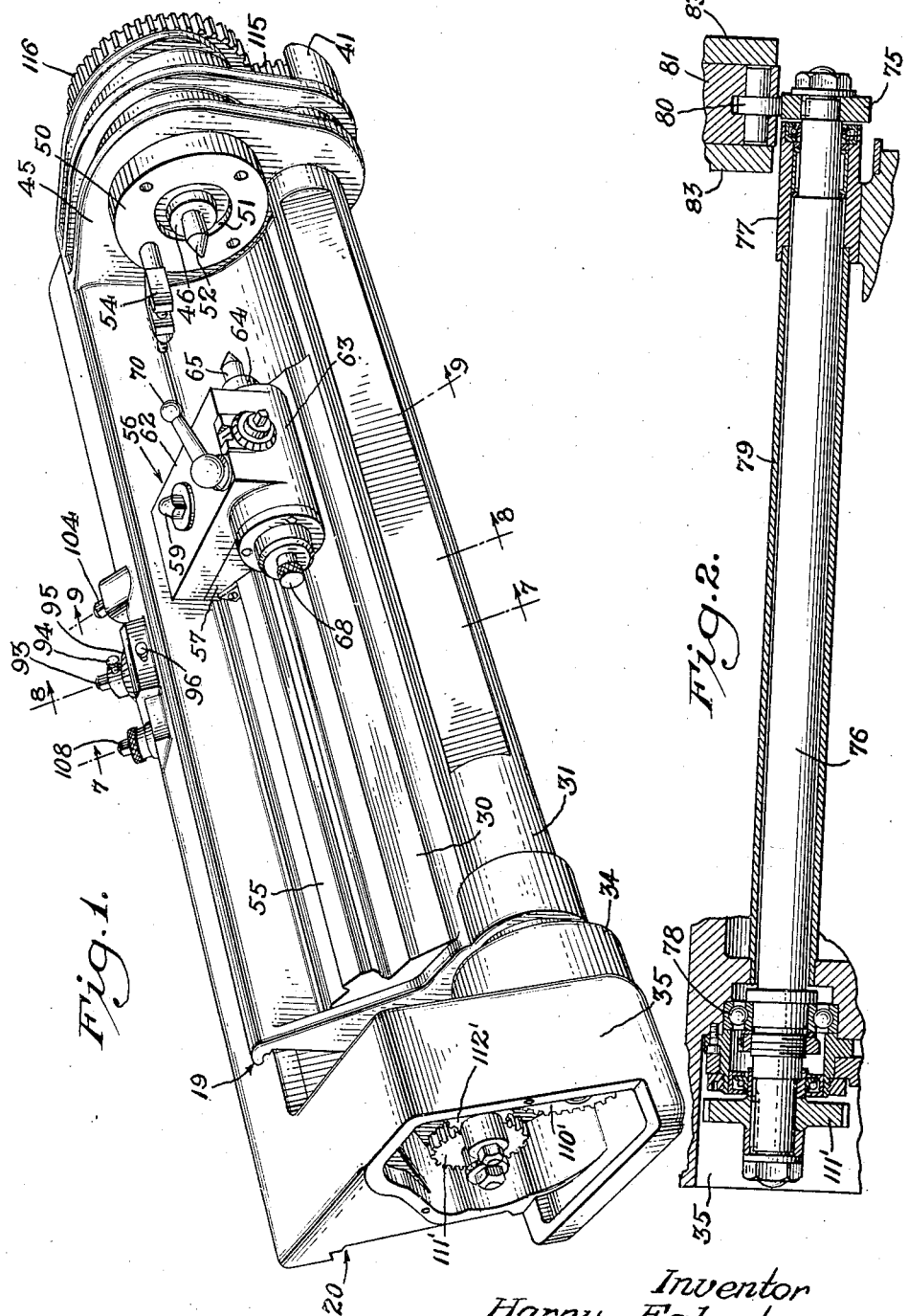
Inventor
Harry Egleston
BY Parker, Carlson, Pitner & Hubbard
Attorneys.

June 26, 1945.                H. EGLESTON                2,379,287
                            BACK-OFF APPARATUS
                            Filed April 6, 1943            5 Sheets-Sheet 2
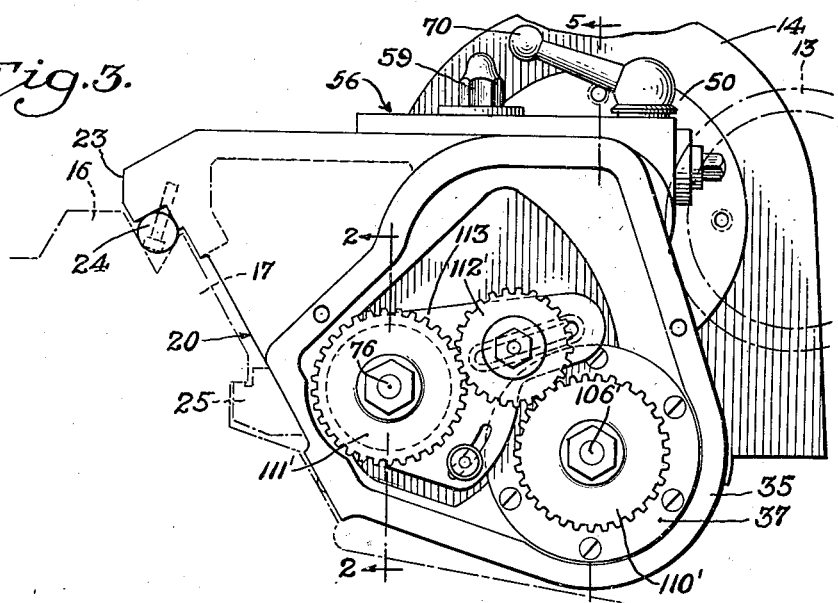
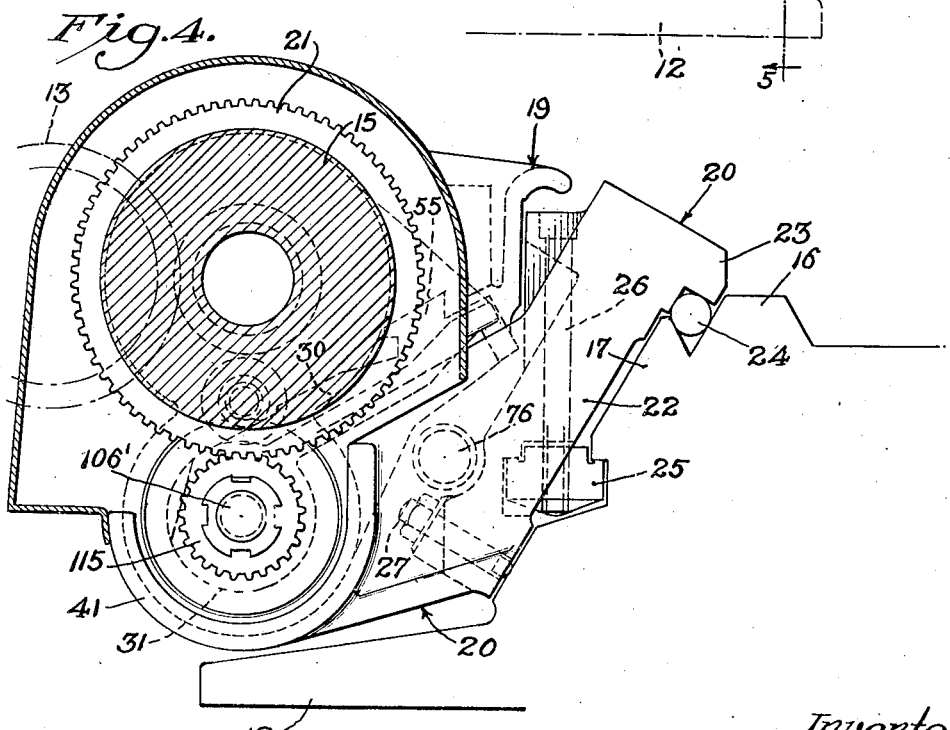
Inventor
Harry Egleston
By
Parker, Carlson, Pitzner & Hubbard
Attorneys June 26, 1945.  H. EGLESTON  2,379,287
BACK-OFF APPARATUS
Filed April 6, 1943    5 Sheets-Sheet 3

Inventor
Harry Egleston
BY
Parker, Carton, Pitney & Hollard
Attorneys.

June 26, 1945.　　　　H. EGLESTON　　　　2,379,287
BACK-OFF APPARATUS
Filed April 6, 1943　　　　5 Sheets-Sheet 4
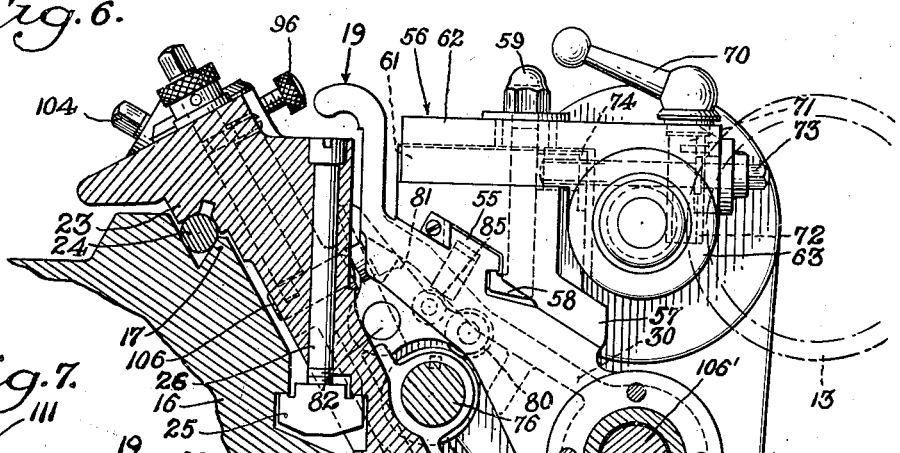
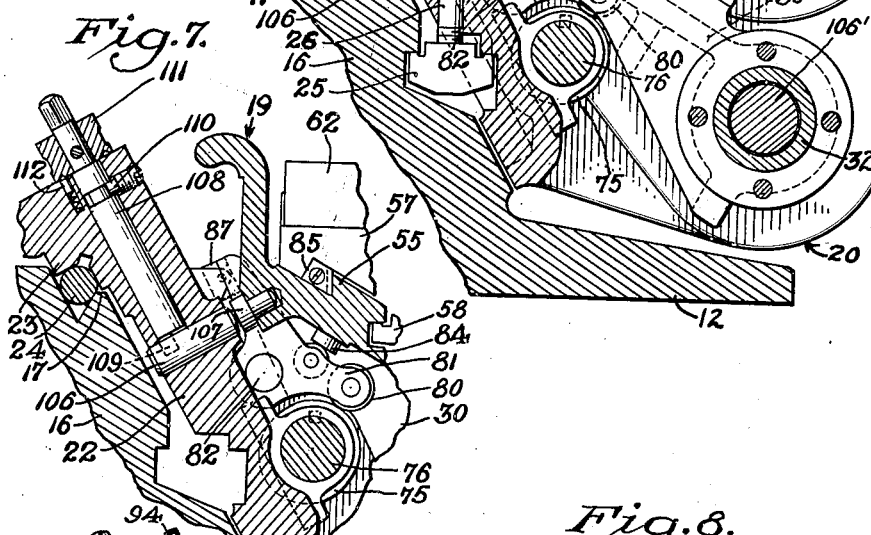
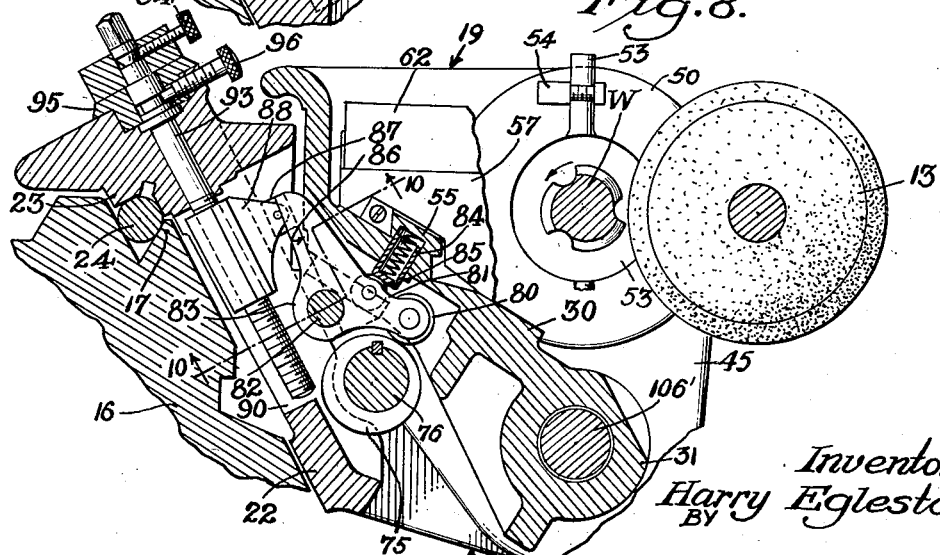
Inventor
Harry Egleston
BY
Parker, Carlson, Pitzner & Hubbard
Attorneys.

Patented June 26, 1945

2,379,287

UNITED STATES PATENT OFFICE 2,379,287

BACK-OFF APPARATUS

Harry Egleston, Detroit, Mich., assignor to Ex-Cell-O Corporation, Detroit, Mich., a corporation of Michigan Application April 6, 1943, Serial No. 481,993

13 Claims. (Cl. 51—94)

The invention relates to apparatus for backing off or relieving taps, hobs or similar tools.

One object of the invention is to provide an improved back-off apparatus in the form of a compact unitary structure or attachment adapted to be applied to conventional thread forming machines to enable the relieving operation to be performed automatically by such machines.

Another object is to provide an attachment of the above general character particularly adapted for the precision grinding of the relief on taps or hobs.

A more specific object is to provide novel means operative to automatically vary the relative positions of a tap and a relieving tool operating thereon in timed relation to the rotation of the tap, whereby successive cutting teeth are accurately formed to provide the precise degree of relief required.

A further object is to provide a back-off attachment capable of being assembled with a thread forming machine without requiring any modification or structural alterations of the machine which would interfere with its normal mode of operation and which is readily adjustable for relieving either straight or tapered taps or hobs and for providing relief of any reasonable depth.

Other objects and advantages of the invention will become apparent from the following detailed description of the preferred embodiment illustrated in the accompanying drawings in which:

Figure 1 is a perspective view of a back-off attachment embodying the features of the invention.

Fig. 2 is a longitudinal sectional view of the attachment taken in a vertical plane substantially on the line 2—2 of Fig. 3.

Fig. 3 is a view of the tailstock end of the attachment.

Fig. 4 is a view of the spindle end of the attachment.

Fig. 6 is a transverse sectional view of the attachment taken in a vertical plane substantially on the line 6—6 of Fig. 5.

Figure 9:
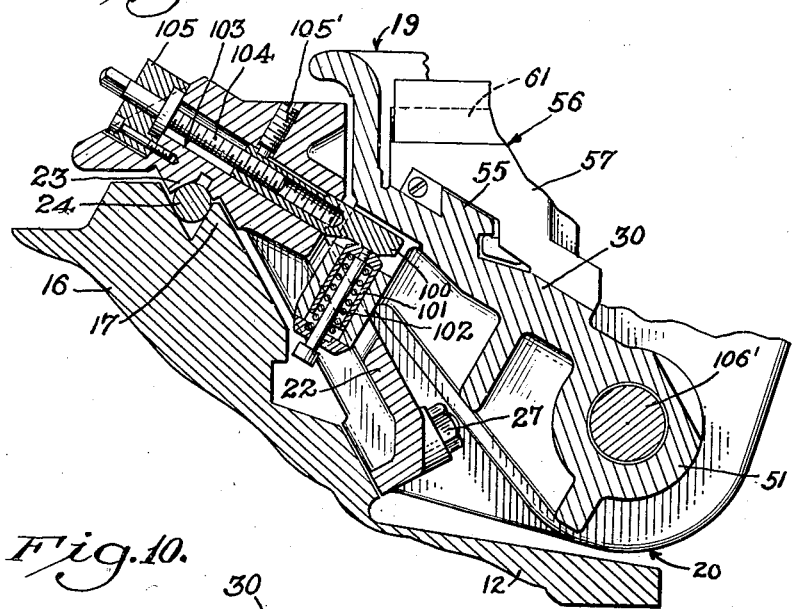

Figs. 7, 8 and 9 are transverse sectional views of the attachment taken respectively in vertical planes substantially on the lines 7—7, 8—8 and 9—9 of Fig. 1.

Figure 10:
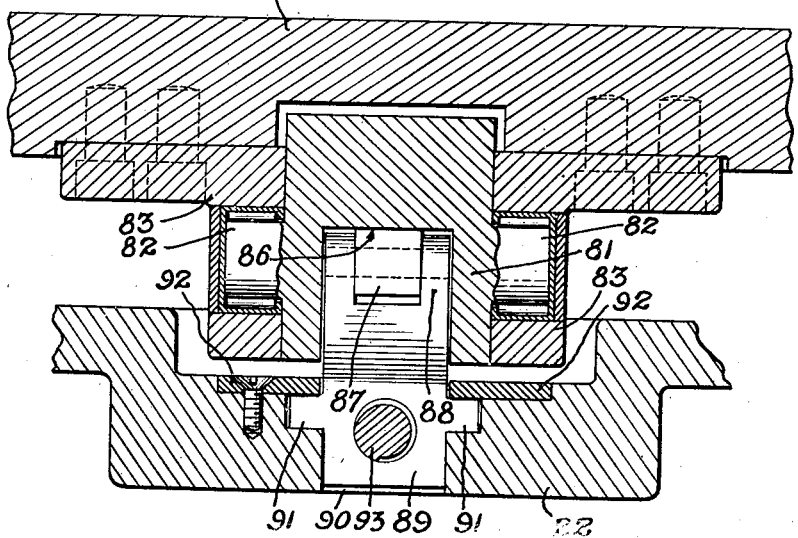

Fig. 10 is a sectional view taken on the line 10—10 of Fig. 8.

While the invention is susceptible of various modifications and alternative constructions, I have shown in the drawings and will herein describe in detail the preferred embodiment, but it is to be understood that I do not thereby intend to limit the invention to the specific form disclosed but intend to cover all modifications, adaptations and alternative constructions falling within the spirit and scope of the invention as expressed in the appended claims.

Figure 5:
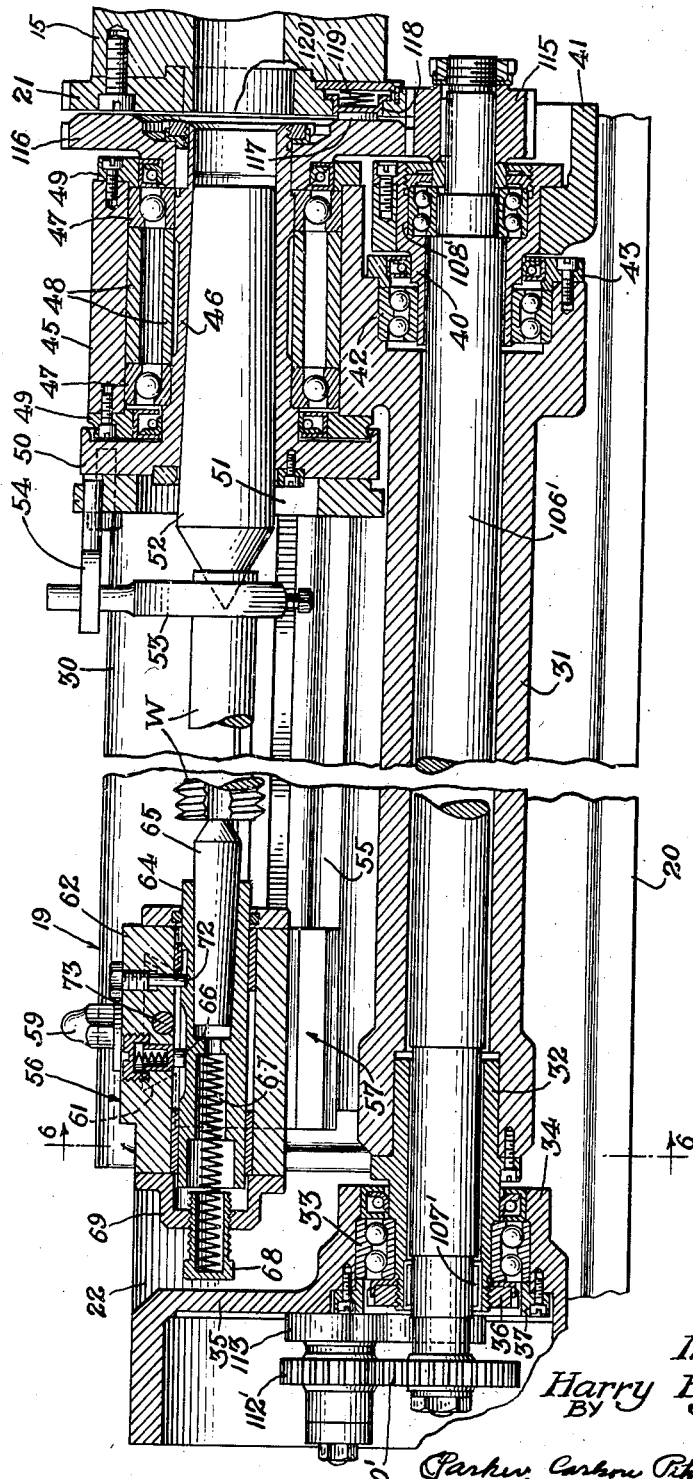
Fig. 5 is a longitudinal sectional view of the attachment taken in a vertical plane substantially on the line 5—5 of Fig. 3.

For purposes of illustration, the invention has been shown in the form most suitable for use with a precision thread grinder of the type disclosed in the Snader Patent No. 2,251,961, granted August 12, 1941. Machines of the above type have a table or carriage 12 (Figs. 3 and 4) reciprocable by means of a feed screw across the face of an adjustably supported, rotatably driven grinding wheel 13. A headstock 14 having a work spindle 15 (Fig. 5) driven in timed relation to the reciprocation of the carriage is mounted at one end of the carriage for movement therewith. The top of the carriage is extended upwardly as at 16 and presents an inclined face toward the grinding wheel upon which is formed a dovetailed guideway 17 extending generally parallel to the axis of the spindle. The guideway normally supports a tailstock in a position to cooperate with the spindle in holding work to be operated on by the grinding wheel.

The back-off attachment constituting the present invention comprises an oscillatory work support 19 with suitable driving mechanism for oscillating the support and simultaneously imparting rotation to a workpiece carried thereby. The work support and driving mechanisms are assembled as a unitary structure on a rigid frame 20 adapted to be mounted on the machine ways 17 in place of the usual tailstock, and without requiring any modification or alteration of the machine structure other than the removal of the tailstock. Moreover, the driving mechanism of the attachment is adapted to receive power from the regular driving instrumentalities or transmission of the machine through the medium of a gear 21 (Figs. 4 and 5) temporarily bolted or otherwise rigidly secured to the face of the spindle 15.

The frame 20 as herein shown, includes a flat, generally rectangular bed 22 having a rearwardly projecting flange 23 along its upper edge. Within the angle defined by the bed and the flange is secured a cylindrical frame locating bar 24 adapted to engage in the upper V-groove formed by the guideway 17. Clamping members 25 threaded for the reception of clamping bolts 26 extending through the bed engage the shoulder defined by the lower edge of the guideway 17 to clamp the frame securely to the machine carriage. For adjusting the frame with respect to the machine spindle, adjusting screws 27 are threaded into the bed in a position to engage the face of the carriage extension as shown in Fig. 4.

The work support 19 is mounted on the frame 20 for oscillating movement toward and from the wheel 13 about a horizontal axis parallel to the axis of the machine spindle and off-set laterally therefrom. The work support, as herein shown, comprises a generally rectangular table 30 heavily ribbed on its underside for rigidity and terminating at one longitudinal edge in a hollow, generally cylindrical housing 31.

Support is provided for one end of the table by a cylindrical hub 32 (Fig. 5) bolted or otherwise rigidly attached to the end of the housing 31 and seating in an anti-friction bearing 33 carried by a sleeve-like extension 34 on a housing 35 rigid with and projecting upwardly from the bed 22. The table is securely held against endwise movement by a shoulder formed on the hub and a nut 36 threaded thereon which engage opposite sides of the inner race ring of the bearing 33. The outer race ring of the bearing is rigidly held against an internal shoulder in the extension 34 by an annular retainer 37.

The other end of the table is supported by a sleeve-like bearing member 40 detachably mounted for convenience of assembly on a bracket 41 projecting upwardly from the bed 22 at the end of the bed opposite the housing 35. The bearing member is arranged to project into an anti-friction bearing 42 seated in a bore formed in the end of the table housing 31. An annular retaining member 43 acts to hold the bearing in the bore. Rising from one end of the table and preferably integral therewith is a headstock 45 in which an auxiliary work spindle 46 is rotatably supported in spaced anti-friction bearings 47. The bearings are held in proper spaced relation by a spacing sleeves 48 and retaining rings 49 at opposite ends of the housing serve to retain the bearings therein.

The spindle 46 is preferably of tubular construction and of the flanged end type. Thus, the outer or operative end is provided with a flange 50 formed with an axial locating bore or recess 51 suitable for the mounting of a chuck or the like. The bore of the spindle is tapered to form a socket for a conventional work center 52 which may be removably inserted therein in lieu of the chuck. When the work center is used, the work is drivingly connected with the spindle by means of a dog 53 clamped to the work and a dog-engaging member 54 carried on the spindle flange. To accommodate a long workpiece, the center 52 is replaced by a suitable chuck and the workpiece is inserted through the alined bores of the spindle 46 and the machine spindle 15.

The top of the table 30 is additionally formed with dovetailed ways 55 extending longitudinally of the table and parallel to the axis of the auxiliary spindle 46. The ways 55 provide adjustable support for a tailstock 56 adapted to cooperate with the spindle in supporting a workpiece such as a tap W (Figs. 5 and 8) to be relieved by the grinding wheel 13. As will be seen by reference to Figs. 1, 5 and 6, the tailstock 56 comprises a main slide 57 formed on its lower surface with guides adapted to coact with the ways 55. An L-headed locking bolt 58 having a nut 59 accessible at the top of the tailstock serves to lock the same in fixed position on the ways.

Mounted on the main slide 57 of the tailstock by means of a dovetailed guideway 61 is a cross slide 62 having a hollow end section 63 in which is mounted a tubular quill 64 (Fig. 5) adapted to hold a conventional tapered work center 65. The quill is supported for endwise movement, but is held against rotation by a spring pressed detent 66 engaging in a keyway therein. A compression spring 67 confined within a bore in the outer end of the quill and bearing against a tubular nut 68 threaded into a cap 69 secured to the cross slide adjacent the end of the quill urges the latter inwardly or to the right as viewed in Fig. 5. The tension of the spring may be readily adjusted by turning the nut 68 so as to provide sufficient pressure on the workpiece to hold it firmly in place while the grinding wheel is operating thereon.

A conveniently accessible hand lever 70 is provided for retracting the quill 64 and center 65 against the action of the spring 67 to permit the insertion of a workpiece between the centers and to release a finished workpiece. As shown in Fig. 6, the hand lever is fixed on the upper end of a vertical shaft 71 journaled on the cross slide and having at its lower end a pinion 72 adapted to coact with rack teeth cut in the side of the quill.

The cross slide 62 may be shifted relative to the main slide by means of a feed screw 73 threaded in a nut 74 rigid with the main slide. The latter is so dimensioned that the axis of the center 65 is in the same plane as the axis of the live center 52. The centers may thus be alined on a common axis for straight work or in predetermined off-set relation for tapered work.

Means is provided for rocking or oscillating the table 30 about its pivotal axis so as to periodically shift the workpiece W toward or from the periphery of the grinding wheel 13. This means, as herein, shown, comprises a cam 75 keyed to the inner end of a shaft 76 extending longitudinally of the frame 20 below the table as shown in Figs. 2 and 6–8. The cam shaft is rotatably supported at its inner end in a bearing 77 upstanding from the bed 22. The outer end of the shaft is arranged to project into the housing 35 and is rotatably supported in an anti-friction bearing 78 carried on the wall of the housing. A sleeve 79 extending between the bearings and encircling the shaft protects the rotating parts from grinding chips and other foreign material.

Coacting with the cam 75 is a follower roller 80 rotatably supported on one arm of a bell crank 81 pivoted on trunnions 82 journaled in a pair of bracket arms 83 depending from the underside of the table as shown in Figs. 2 and 10. A spring pressed plunger 84 (Fig. 8) seated in a recess in the underside of the table bears against a roller 85 mounted on the bell crank to urge the follower roller 80 toward the cam.

The other arm of the bell crank 81 is formed with a downwardly facing bearing surface 86 adapted to ride on a fulcrum block 87 pivotally supported on a bifurcated arm 88 upstanding from a slide 89. When the cam is rotated, the bell crank is rocked about the pivot of the fulcrum block and corresponding movements are imparted to the table through the bell crank trunnions 82. The slide is supported for movement transversely of the table in a slot extending across the bed 22 and is confined within the slot and guided in its movements by laterally projecting flanges 91 engaging in grooves cut in the side walls of the slot and retained therein by overlapping retaining plates 92.

The guideway for the slide 89 is disposed substantially parallel to the bearing surface 86 of the bell crank 81 so that the shifting of the slide is effective to vary the fulcrum point and consequently the range of oscillation of the trunnions 82 by which the bell crank is secured to the table. Since the throw of the cam 75 remains constant the position of the slide and consequently the fulcrum point of the bell crank 81 determines the range of oscillation of the table and therefore the depth or degree of relief produced on the workpiece. Such adjustments are effected, in this instance, by a screw 93 threaded into the slide and rotatably anchored in the bed 22. The upper end of the screw, which is squared for the reception of a wrench or similar tool, projects from the upper edge of the bed for convenient access. Adjustably mounted on the projecting end of the screw and adapted to be clamped thereto as by a thumb screw 94, is a graduated dial in the form of a collar 95 for indicating the adjusted position of the mechanism. A locking screw 96 is provided for locking the parts in adjusted position.

Means is provided for yieldably urging the table 30 toward the cam 75 with sufficient pressure to insure accurate and instantaneous response of the table when the cam is rotated at relatively high speeds. This means, as shown in Fig. 9, comprises an abutment herein shown as a bar 100 rigidly supported on the upper portion of the bed 22 and having a flattened nose portion projecting into a slot in the underside of the table. A plunger 101, seated in a recess in a section of the table underlying the slot, is urged upwardly against the bar by a coiled compression spring 102. The force exerted by a spring together with the weight of the table and elements mounted thereon tend to rock the table in a counterclockwise direction (as viewed in Fig. 9) and thus insure constant engagement between the follower roller 80 and the cam 75. As the cam is rotated, the table is alternately rocked counterclockwise against the action of the spring through a distance determined by the throw of the cam and the adjusted position of fulcrum block 87 and then returned to retracted position as the cam surface recedes from the follower.

To permit the table to be tilted forwardly beyond its normal oscillating range so that access may be had to the cam 75, the bar 100 is arranged for convenient withdrawal from the path of the plunger 102. For this purpose, the bar is slidably supported for endwise movement in a bore 103 formed in the bed 22. Shifting of the bar between the operative and retracted positions is effected by a feed screw 104 threaded into the end of the bar and rotatably anchored in a collar 105 bolted or otherwise rigidly secured to the bed. The bar is held against rotation with the screw by a detent 105' threaded into the bed and engaging in a longitudinal keyway in the bar. As shown in Figs. 1 and 9, the upper end of the feed screw is arranged to project at the upper edge of the bed for convenient access and is preferably squared for engagement by a wrench or other suitable tool.

The improved back-off attachment may also be used for operating on non-relieved workpieces when desired, by shifting the table 30 forwardly to move the follower roller out of operative engagement with the cam 75. For this purpose a plunger 106 is slidably supported in a recess in the bed 22 with its inner end positioned to coact with a pad or button 107 fixed to the underside of the table. The plunger is adapted to be shifted axially by means of a rock shaft 108 having an eccentric pin 109 on its inner end engaging in a notch in the side of the plunger. The shaft is rotatably mounted in a bore in the bed with its upper end projecting therefrom at one side of the adjusting screw 73, as shown in Fig. 1. A locking pin 110 engaging in an annular groove in the shaft holds the same against endwise movement.

Pinned to the outer end of the shaft is a collar 111 adapted to coact with a spring pressed detent 112 to hold the shaft in either of two selected positions. In the position shown in Fig. 7, the plunger 106 is withdrawn, thus permitting the cam 75 to perform its function of oscillating the table. Rotation of the shaft 108 to its alternate position is effective to project the plunger from its recess and thus shift the table outwardly to a position in which the follower roller 80 is beyond the effective reach of the cam 75.

In order to form precisely the same degree of relief on each of a series of peripherally spaced cutting teeth on a tap or other work being operated on, the oscillation of the work supporting table must be accurately timed with respect to the rotation of the work. In accordance with the present invention, accurate timing is attained by utilizing a common drive mechanism for driving both the work spindle 46 and the cam shaft 76. The drive mechanism, as herein shown, includes a drive shaft 106' extending through the table housing 31. Needle bearings 107' (Fig. 5) support one end of the shaft within the hub 32 while an anti-friction bearing 108' supports the other end within the sleeve bearing 40. As described hereinafter, the hub and sleeve bearing provide pivotal support for the table and the drive shaft is thus rotatable about an axis coincident with the axis of oscillation of the table.

The shaft 106' is drivingly connected with the cam shaft 76 by change-speed gearing within the housing 35 into which both shafts extend. The gearing, as herein shown, includes a gear 110' (Figs. 1, 3 and 5) keyed to the drive shaft, a gear 111' keyed to the cam shaft and an idler gear 112' meshing with the other two gears. The idler gear is adjustably supported on a bracket 113 mounted to swing about the axis of the cam shaft to permit proper registration with gears of different diameter. The particular gears utilized in any machine set-up are determined by the number of peripheral teeth on the tap being relieved. Thus when the machine is being set up for operation on a three-fluted tap, such as that shown in Fig. 8, a gear set capable of effecting three revolutions of the cam shaft for each revolution of the work spindle is provided. In other words the cam shaft is driven through a complete revolution for each flute of the workpiece.

The shaft 106' is drivingly connected at its other end with the live spindle 46 by means of a wide faced pinion 115 meshing with a gear 116 keyed to the spindle. The pinion is also utilized to couple the drive shaft with the gear 21 thereby providing a power take-off from the machine spindle which is unaffected as to the center distance of gears 21 and 116 with respect to either common coacting gear 115 as the table 30 accomplishes its oscillation. Proper meshing of the pinion with this gear is readily effected by manipulation of the adjusting screw 27 previously described.

Novel means is provided for eliminating backlash between the gears 116 and 21 and the pinion 115 and for effectually preventing excessive oscillation or bouncing of the oscillating parts when operating at high speed. For this purpose the driving gear 21 on the machine spindle is provided with a plurality of friction disks 117 positioned to engage the rear face of the gear 116 on the auxiliary spindle 46. These gears are arranged in face-to-face relation with the latter gear describing a relatively small arc across the face of the fixed gear during the oscillation of the work table.

The disks 117 are preferably carried by cup-shaped backing members 118 seated in recesses in the face of the gear 21. Compression springs 119 interposed between the backing members and cover plates 120 fitted over the recesses urge the friction disks outwardly against the face of the gear 116. The frictional connection thus provided tends to carry the auxiliary spindle along with the machine spindle and thus maintain the teeth of the gears 21 and 116 in the same relation with respect to the teeth of the pinion 115 while the gear 116 oscillates with the work table. Moreover the action of the friction disks tends to dampen the oscillation of the table and thus effectively confine it within the range of movement imparted by the cam.

To mount the improved back-off attachment on a thread grinder, the regular tailstock is removed from the carriage ways and the attachment is placed thereon with the locating bar 24 engaging in the upper groove formed by the ways. The frame is then adjusted to insure proper meshing of the pinion 115 with the driving gear 21 which has, of course, been bolted to the face of the work spindle. This adjustment is effected by turning the adjusting screws 27. The locking bolts 26 are then tightened to clamp the frame to the carriage.

Change-speed gears 110 and 111, which are readily assembled in the housing 35, may be replaced if necessary to give the required rotative speed to the cam as determined by the number of peripheral teeth on the tap or hob to be relieved. Likewise, the cam 75 may be replaced by a similar cam designed to give an altered range of adjustable depths of relief. The cam is changed with the abutment member 100 withdrawn and the table swung outwardly. To condition the apparatus for operation, the abutment member is shifted forwardly to engage the plunger 101 and hold the table securely against the cam. Fine adjustments of the oscillating range of the table to determine the depth of the relief are effected by turning the adjusting screw 93 which is then locked in adjusted position by means of the locking screw 96.

With the parts properly adjusted, the work may be inserted between the centers 52 and 64, the latter being retracted for this purpose by manipulation of the hand lever 70. The grinding wheel is then advanced in the usual manner to the position determined by the cutting edges of the teeth. Thereafter the machine is started in the usual manner and the operation proceeds without further attention by the attendant.

It will be apparent from the foregoing that the invention provides apparatus of novel and improved construction for backing-off or relieving taps, hobs or similar tools. The apparatus is in the form of a compact, unitary structure or fixture adapted to be applied as an attachment to a conventional thread forming machine to enable the machine to perform the relieving operation automatically. The various parts are strong and rigid and are assembled in a manner such that precision finishing of the work is insured. Moreover the parts are readily adjustable for relieving either straight or tapered work and for providing relief of any reasonable depth.

I claim as my invention:

1. A back-off attachment adapted to be mounted adjacent the rotatably driven work spindle of a thread forming machine, said attachment comprising, in combination, a table supported for oscillation about an axis parallel to the axis of the machine spindle, a cam shaft positioned to oscillate the table, an auxiliary work spindle rotatably supported on the table, a gear adapted to be fixed on the machine spindle, a drive shaft supported for rotation on an axis coincident with the axis of oscillation of the table, a pinion on said drive shaft meshing with both said gears whereby the drive shaft and said auxiliary spindle are driven from the machine spindle, and change-speed gearing operatively connecting said drive shaft and said cam shaft.

2. A back-off attachment adapted to be mounted adjacent the rotatably driven work spindle of a thread forming machine, said attachment comprising, in combination, a pivotally supported table, means operative to oscillate said table, an auxiliary work spindle journaled on the table, a gear adapted to be fixed on the machine spindle, a gear fixed on said auxiliary spindle, a shaft supported for rotation on an axis coincident with the pivotal axis of the table, a pinion on said shaft meshing with both of said gears, and means providing a driving connection between said shaft and said table oscillating means.

3. A back-off attachment adapted to be mounted adjacent the rotatably driven work spindle of a thread forming machine, said attachment comprising, in combination, a pivotally supported table, means operative to oscillate said table, an auxiliary work spindle journaled on the table, a gear adapted to be fixed on the machine spindle, a gear fixed on said auxiliary spindle, and a pinion meshing with both of said gears, said pinion being supported for rotation about an axis coincident with the pivotal axis of the table.

4. A back-off attachment adapted to be mounted adjacent the rotatably driven work spindle of a thread forming machine, said attachment comprising, in combination, a pivotally supported table, means operative to oscillate said table, an auxiliary work spindle journaled on the table, and means providing a driving connection from the machine spindle to said auxiliary spindle and to said table oscillating means.

5. A back-off attachment adapted to be mounted on a thread forming machine having a rotatably driven work spindle, said attachment comprising, in combination, a table supported for oscillation about an axis substantially parallel to the axis of the machine spindle, means for oscillating the table, an auxiliary work spindle rotatably supported on said table in substantial alinement with the machine spindle, a pair of gears disposed in face-to-face relation and fixed respectively to the machine spindle and the auxiliary spindle, a pinion meshing with both said gears, said pinion being supported for rotation on an axis coincident with the axis of oscillation of the table, and means operative to eliminate backlash between said gears and said pinion.

6. A back-off attachment adapted to be mounted on a thread forming machine having a rotatably driven work spindle, said attachment comprising, in combination, a table supported for oscillation about an axis substantially parallel to the axis of the machine spindle, means for oscillating the table, an auxiliary work spindle rotatably supported on said table in substantial alinement with the machine spindle, a pair of gears disposed in face-to-face relation and fixed respectively to the machine spindle and the auxiliary spindle, a pinion meshing with both said gears, said pinion being supported for rotation on an axis coincident with the axis of oscillation of the table, and means carried by one of said gears frictionally engaging the face of the other gear to eliminate backlash between the gears and the pinion.

7. A back-off attachment adapted to be mounted on a thread forming machine having a rotatably driven work spindle, said attachment comprising, in combination, a table supported for oscillation about an axis substantially parallel to the axis of the machine spindle, means for oscillating the table, an auxiliary work spindle rotatably supported on said table in substantial alinement with the machine spindle, a pair of gears disposed in face-to-face relation and fixed respectively to the machine spindle and the auxiliary spindle, a pinion meshing with both said gears, said pinion being supported for rotation on an axis coincident with the axis of oscillation of the table, a series of friction elements mounted in the face of the gear fixed on the machine spindle, and spring means yieldably urging said elements against the face of the gear fixed on the auxiliary spindle, said elements acting to eliminate backlash between the gears and the pinion.

8. A back-off attachment comprising, in combination, a frame, an elongated table pivotally supported adjacent one edge on said frame, work supporting means on said table, table oscillating means including a rotatably driven cam supported on the frame below said table, a follower roller mounted on the table in a position to coact with said cam, an abutment rigidly mounted on said frame, and a spring pressed plunger on the table adapted to engage said abutment and yieldably urge the follower roller against the cam, said abutment being retractible from the path of said plunger to free the table for movement beyond its normal range of oscillation.

9. A back-off attachment comprising, in combination, a frame, an elongated table pivotally supported adjacent one edge on said frame, work supporting means carried by the table, table oscillating means including a rotatably driven cam supported on the frame below the table, a bell crank mounted on the underside of the table, a follower roller journaled on one arm of said bell crank in a position to coact with said cam, and adjustable means on the frame adapted to coact with the other arm of said bell crank to determine the range of oscillation of the bell crank and the table upon which it is mounted.

10. A back-off attachment comprising, in combination, a frame, an elongated table pivotally supported adjacent one edge on said frame, work supporting means carried by the table, table oscillating means including a rotatably driven cam supported on the frame below the table, a bell crank mounted on the underside of the table, a follower roller journaled on one arm of said bell crank in a position to coact with said cam, an elongated bearing surface formed on the other arm of said bell crank, and a member supported on said frame for engagement by said bearing surface to define a fulcrum for the bell crank, said member being shiftable for engagement with different areas of the bearing surface to vary the range of oscillation of the bell crank and the table.

11. A back-off attachment comprising, in combination, a frame, an elongated table pivotally supported adjacent one edge on said frame, work supporting means carried by the table, table oscillating means including a rotatably driven cam supported on the frame below the table, a bell crank mounted on the underside of the table, a follower roller journaled on one arm of said bell crank in a position to coact with said cam, an elongated bearing surface formed on the other arm of said bell crank, a member supported on said frame for engagement by said bearing surface to define a fulcrum for the bell crank, manually operable adjusting means for shifting said member to engage different areas of the bearing surface and thereby vary the range of oscillation of the table, and means for locking said adjusting means in adjusted position.

12. A back-off attachment adapted to be mounted adjacent the rotatably driven spindle of a thread forming machine, said attachment comprising, in combination, a frame, an elongated table having a hollow cylindrical housing at one side edge, bearings at opposite ends of said housing pivotally supporting the table on said frame, said table being rigidly held against endwise movement in said bearings, a work supporting spindle mounted on the table, table oscillating means mounted on the frame, a shaft extending axially through said housing and having one end journaled therein, bearing means on the frame rotatably supporting the other end of the shaft, gearing at one end of the shaft connecting with said table oscillating means, and gearing at the other end of the shaft connecting with said work supporting spindle and the driven spindle of the machine.

13. A back-off attachment for a machine having a thread forming tool and a rotatably driven spindle for holding work to be operated on by the tool, said attachment comprising, in combination, a frame adapted to be removably secured to the machine, a table supported on said frame for oscillating movements toward and from the thread forming tool of the machine, table oscillating means, an auxiliary spindle journaled on said table and adapted to hold work to be operated on by the thread forming tool, and means providing a driving connection from the machine spindle to said auxiliary spindle and said table oscillating means.

HARRY EGLESTON.